| United States Patent [19] | [11] Patent Number: 4,655,967 |
| Morimoto et al. | [45] Date of Patent: Apr. 7, 1987 |

[54] ELECTRICALLY CONDUCTIVE TITANATE DERIVATIVE AND PROCESS FOR PREPARING THE SAME

[75] Inventors: Takuo Morimoto, Kyoto; Kihachiro Nishiuchi, Tokushima; Kenichi Wada, Tokushima; Masayoshi Suzue, Tokushima; Yukiya Hareyama, Tokushima, all of Japan

[73] Assignee: Otsuka Kagaku Kabushiki Kaisha, Osaka, Japan

[21] Appl. No.: 743,744

[22] Filed: Jun. 12, 1985

[30] Foreign Application Priority Data

Jun. 12, 1984 [JP] Japan .................................. 59-121044

[51] Int. Cl.$^4$ ............................................... H01B 1/06

[52] U.S. Cl. ..................................... 252/520; 252/518; 501/134

[58] Field of Search ................. 252/520, 518; 501/134

[56] References Cited

U.S. PATENT DOCUMENTS

| 3,268,783 | 8/1966 | Saruri | 317/237 |
| 3,704,266 | 11/1972 | Ueoka et al. | 252/520 |
| 4,362,637 | 12/1982 | Matsuo et al. | 252/520 |
| 4,547,314 | 10/1985 | Masuyama et al. | 252/520 |

*Primary Examiner*—Josephine L. Barr
*Attorney, Agent, or Firm*—Murray and Whisenhunt

[57] ABSTRACT

An electrically conductive titanate derivative containing an element other than titanium is prepared by baking a mixture of a titanate and a compound containing an element other than titanium.

7 Claims, No Drawings

ELECTRICALLY CONDUCTIVE TITANATE DERIVATIVE AND PROCESS FOR PREPARING THE SAME

The present invention relates to an electrically conductive titanate derivative and process for preparing the same.

According to enhanced needs for electrically conductive materials in recent years, many attempts are made to develop materials which can be used as a static eliminating material, antistatic material, electrically conductive material, etc.

Examples of conventional electrically conductive materials are electroconductive metals such as gold, silver, platinum, copper, nickel, etc; carbon; metal oxides such as tin oxide, antimony oxide, etc; organic electroconductive compounds such as polyacetylene, etc. These electrically conductive materials are used to prepare various products having electroconductivity such as a coating composition, adhesive, ink, cloth, fiber, shaped product, baked product, etc.

In order to give electroconductivity to a titanate, it has been generally known to cover titanate surface with an electrically conductive substance, or to reduce a titanate to obtain a titanate having a lower oxidation degree.

In the former covering process, an electrically conductive substance is deposited on titanate surface by physical or chemical method to obtain a titanate covered with the electrically conductive substance. As the electrically conductive substances are used silver, copper, nickel, tin, antimony, etc. Due to a simple procedure in this process, electroless plating techniques are conveniently employed. In this process, there is an advantage that the starting titanate is in no way changed in quality to provide electroconductivity. However, the starting titanate is generally in the form of a fine powder having a specific surface area of 10 to 100 m$^2$/g. Thus, it is necessary to use 1 to 5 grams of the electrically conductive substance per gram of the starting titanate to uniformly cover the titanate powder surface and to achieve electroconductivity effectively. This means the substance is necessary in an equal amount or more based on the weight of the titanate. Thus, it is difficult to use properties inherent to the titanate and the resulting electroconductive titanate becomes expensive which has a limited industrial use.

In the latter reduction process, a titanate is baked in a reduction atmosphere, or a titanate is prepared in a reduction atmosphere to obtain an electrically conductive titanate having a lower oxidation degree, represented by the formula $$M_xO.nTiO_{2-y}$$

wherein M is alkali metal or alkaline earth metal, n is an integer of 1 to 10, x is 1 or 2, y is a number of $0<y<2$. In the reduction process, it is possible to control an electroconductivity by selectively producing a titanate having a desired oxidation degree by choosing the reducing conditions, thereby rendering the process very advantageous. However, there are disadvantages that some titanates are difficult to be reduced, or reduction must be conducted at a high temperature or for a long period of time, a crystal state changes during the reduction, etc.

An object of the invention is to provide an electrically conductive titanate derivative which maintains properties inherent to the titanate, by use of a small amount of a metal other than titanium.

Another object of the invention is to provide an electrically conductive titanate derivative which can be prepared by a simple and economical process in which the starting titanate is baked in an inert gas or air, without employing a reduction process.

Another object of the invention is to provide a method of giving electroconductivity to a titanate which is hardly reduced by the conventional reduction process.

Still another object of the invention is to provide an electrically conductive titanate derivative which can be prepared by reduction process at milder conditions than the conventional reduction process.

The present invention provides an electrically conductive titanate derivative which is characterized in that an element other than titanium is introduced to the titanate. The titanate derivative of the invention is prepared by baking a mixture of a titanate and a compound containing a metal other than titanium.

Examples of the starting titanates of the invention are:

a titanate represented by the formula $M_xO.nTiO_2$ (M is alkali metal or alkaline earth metal, n is an integer of 1 to 10, x is 1 or 2), a titanate having a lower oxidation degree represented by the formula $M_xO.nTiO_{2-y}$ (M, n and x are same as defined above, y is a number of $0<y<2$) and, a hydrated compound of the above titanates. In the above, x is 2 when M is alkali metal, and x is 1 when M is alkaline earth metal.

These alkali metal titanate and alkaline earth metal titanate can be produced by the conventional method wherein a titanium compound is reacted with an alkali metal compound or alkaline earth metal compound, such as melt process, flux process, alcoholate process, etc. The titanate having a lower oxidation degree can be prepared by baking the alkali metal titanate or alkaline earth metal titanate in a reducing atmosphere, or can be obtained by conducting its synthesis in a reducing atmosphere. In the invention, the starting titanates can be used singly or in a mixture of them.

In the invention, examples of elements other than titanium are those of group (V) of the periodic table except for nitrogen, such as V, Nb, Ta, P, As, Sb and Bi. Examples of compounds containing the element are oxides, hydroxides, halides, nitrates, nitrites, sulfates, sulfites, alcoholates, organic complex compounds thereof. In the invention, these compounds can be used singly or in a mixture of them.

In the invention, the proportions of the titanate and the compound containing an element other than titanium vary depending on the purpose for use or kinds of the starting materials. The compound is used in an amount of preferably 0.001 to 100 parts (weight parts, same hereinafter), more preferably 0.1 to 50 parts per 100 parts of the titanate. The element other than titanium is contained in an amount of preferably 0.01 to 50 mole% based on one atom of titanium in the titanate.

In the invention, the titanate and the compound containing an element other than titantium are mixed, and the mixture is filled in a heat-resistant vessel and baked in a furnace. In case both of the titanate and the compound are in the form of a powder, they can be mixed by a usual mixing machine. However, the element can be introduced to the titanate with an increased velocity by enhancing the contact effect of the titanate and the compound. Thus, when the compound is soluble in water, organic or inorganic solvent, the titanate and a solution of the compound are mixed homogeneously and the mixture is air-dried, heat-dried or, most conveniently, spray-dried. Even when the compound is not soluble in a solvent, the titanate and the compound can be dispersed in an appropriate dispersing medium and the dispersion is air-dried, heat-dried or spray-dried to obtain a homogeneous mixture.

In the invention, it is possible to use, as a dispersing medium, those which burn, disperse or carbonize upon baking, other than the above organic or inorganic solvent. Examples of the dispersing media are a dispersant, viscosity increasing agent, defoaming agent, etc. As other dispersing media are used a high polymer solution, viscous resin, sizing agent, etc which gives a fluidity to the homogeneous mixture or improves operability in baking process.

It is possible to prepare an electrically conductive sintered product with use of the present electrically conductive titanate derivative. In this case, although the present electrically conductive titanate derivative can be sintered, it is convenient to simultaneously bake and sinter a shaped product which is prepared by mixing the titanate, the compound containing an element other than titanate and when desired a sintering auxiliary agent and pressing the resulting mixture.

In the invention, the baking atmosphere is not limited particularly and may be any of air, inert gas atmosphere, reducing atmosphere, etc. It is possible to obtain a product which is more electrically conductive in inert gas atmosphere than air. Further, an electrically conductive titanate derivative can be prepared more effectively in reducing atmosphere since the titanate is reduced to a lower oxidation degree. In this case, various reducing auxiliary agents such as carbon, SiC, TiC, etc can be employed conjointly without decreasing the effects of the invention.

When, as the starting material, is used the titanate having a lower oxidation degree of the above formula $M_xO \cdot nTiO_{2-y}$, the titanate is baked preferably in inert gas or reducing atmosphere. If this titanate is baked in an atmosphere containing oxgen such as air, etc, the titanate is oxidized, and the effects derived from use of the titanate having a lower oxidation degree as the starting material are decreased.

In the invention, the baking temperature is usually 600° to 1500° C., preferably 800° to 1400° C. and the baking time is preferably 10 minutes to 8 hours, though depending on the baking temperature, the purpose for use, kinds of the starting materials, etc.

In the invention, an element other than titanium is introduced to titanate crystal lattice, unlike conventional covering process or reduction process. Thus, the electrically conductive titanate derivative obtained by the present invention exhibits an excellent electroconductivity due to an ionization of titanium ion vacant lattice.

The electrically conductive titanate derivative of the invention is represented by the formula $$M_xO \cdot n(Ti_{1-z}L_2O_{2-p})$$

wherein M, x and n are as defined above, L is an element of group (V) of the periodic table other than nitrogen, p is a number of $0 \leq p < 2$, z is a number of $0 < z \leq \frac{1}{3}$. 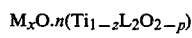

The present titanate derivative is an electrically conductive material which is in the form of a fine powder, fine fiber, fine layer, etc. The present derivative provides an electroconductive sintered product by sintering, electroconductive coating composition, ink or adhesive by mixing with a binder, electroconductive shaped product, sheet or the like by mixing with a resin, electroconductive cloth or fiber by making into paper or mixing with fiber. Thus, the present titanate derivative functions as a reinforcing electroconductive material and provides effectively an electroconductive composite material without deteriorating the heat resistance which is a characteristic inherent to the conventional inorganic electroconductive materials.

The present titanate derivative is useful as a material for an electroconductive composite product without decreasing excellent characteristics inherent to the titanate having a wide industrial use, such as a heat resistance, dimensional stability, surface smoothness, reinforcing ability, etc.

The invention will be described in detail with reference to Examples and Comparison Examples, in which part is weight part unless otherwise specified.

EXAMPLE 1

Into a polyethylene vessel were placed 10 parts of potassium titanate [Trademark; Tismo D, a product of Otsuka Kagaku K.K.] and 1 part of diantimony trioxide. The mixture was dry-mixed for one hour by a vibrator and then placed into a 10-ml platinum boat. The mixture was baked in a tubular furnace in air atmosphere for 6 hours. The baked product was taken out from the furnace and cooled to room temperature to prepare a light blue electrically conductive potassium titanate derivative.

The electroconductivity was measured by the following method.

The titanate derivative was placed into a tablet-press machine and shaped while removing air at a pressure of 200 kg/cm² to prepare a tablet, 12 mm in diameter and 5 mm in thickness. Pt-Pd alloy was pressed into contact by vacuum evaporation with each end face of the tablet to prepare electrodes. The volume resistivity was measured by a digital multimeter, TR-6841 (a product of Takeda Riken Co., Ltd.).

The above electroconductive potassium titanate derivative had a volume resistivity of $7.6 \times 10^8$ Ω·cm.

COMPARISON EXAMPLE 1

Potassium titanate only used in Example 1 was baked in the same manner as in Example 1. Potassium titanate and antimony oxide used in Example 1 were merely mixed. Both of the above baked product and the mixture were white-colored and had a volume resistivity of at least $10^{12}$ Ω·cm.

EXAMPLES 2 TO 6 AND COMPARISON EXAMPLES 2 TO 6

Potassium titanate derivatives were prepared with use of a mixture of potassium titanate and antimony oxide used in Example 1 in the same manner as in Example 1 except that the baking atmosphere, temperature and time were varied. Comparison Examples were carried out by use of potassium titanate only. The results were shown in Table 1.

TABLE 1

| | Atmosphere | Temp (°C.) | Time (hr) | Color | Volume resistivity (Ω·cm) |
|---|---|---|---|---|---|
| Ex. | | | | | |
| 2 | $N_2$ | 850 | 4 | light blue | $1.7 \times 10^5$ |
| 3 | $N_2$ | 950 | 2 | light blue | $3.2 \times 10^5$ |
| 4 | $N_2$ | 1050 | 1 | light blue | $8.3 \times 10^5$ |
| 5 | $H_2$ | 850 | 1 | dark blue | $2.3 \times 10$ |
| 6 | $H_2$ | 950 | 0.5 | dark blue | $1.5 \times 10$ |
| Com. Ex. | | | | | |
| 2 | $N_2$ | 850 | 4 | white | at least $10^{12}$ |
| 3 | $N_2$ | 950 | 2 | white | at least $10^{12}$ |
| 4 | $N_2$ | 1050 | 1 | white | at least $10^{12}$ |
| 5 | $H_2$ | 850 | 1 | light blue | $5.9 \times 10^5$ |
| 6 | $H_2$ | 950 | 0.5 | light blue | $9.3 \times 10^5$ |

EXAMPLES 7 TO 12

Titanate derivatives were prepared in the same manner as in Example 1 except that the kind of titanate, baking atmosphere, temperature and time were varied. The results were given in Table 2. In the Table, (1): Trade name; Ruflux, a product of NL Industries Ltd. U.S.A.
(2): Trade name; BT-100PL, a product of Fuji Titanium Industry Co., Ltd.
(3): Trade name; P-100, a product of Fuji Titanium Industruy Co., Ltd.

COMPARISON EXAMPLES 7 TO 12

Titanate derivatives were prepared in the same manner as in Examples 7 to 12 except that antimony oxide was not used. Each of the resulting titanate derivatives showed a volume resistivity of at least 10 Ω·cm.

TABLE 2

| Ex. | Titanate | Atmosphere | Temp (°C.) | Time (hr) | Color | Volume resistivity (Ω·cm) |
|---|---|---|---|---|---|---|
| 7 | sodium titanate (1) | air | 1200 | 6 | light blue | $5.3 \times 10^7$ |
| 8 | sodium titanate (1) | $N_2$ | 1200 | 4 | light blue | $7.1 \times 10^5$ |
| 9 | barium titanate (2) | air | 1250 | 6 | light blue | $4.1 \times 10^5$ |
| 10 | barium titanate (2) | $N_2$ | 1250 | 4 | light blue | $1.2 \times 10^5$ |
| 11 | magnesium titanate (3) | air | 1250 | 6 | light blue | $6.3 \times 10^{10}$ |
| 12 | magnesium titanate (3) | $N_2$ | 1250 | 4 | light blue | $3.1 \times 10^5$ |

EXAMPLE 18

A 10 parts-quantity of potassium titanate (Tismo D) was mixed with 15 parts of methanol solution containing 10% by weight of antimony chloride. The mixture was spray-dried to obtain powders consisting of potassium titanate and antimony chloride, 82% of which being in a particle size of 40 to 80 μm.

The particles are placed into a platinum boat and baked at 900° C. for 2 hours at nitrogen atmosphere with use of the same furnace as in Example 1 to prepare a light blue electrically conductive potassium titanate derivative having a volume resistivity of $1.9 \times 10^5$ Ω·cm.

EXAMPLE 14

To 10 parts of reduced potassium titanate [Trade mark, Tismo BK-100, a product of Otsuka Kagaku K.K.] was added 0.2 part of niobium oxide. Potassium titanate derivative was prepared in the same manner as in Example 3 except that the above mixture was baked at 950° C. for 30 minutes.

While the starting reduced potassium titanate was a light blue powder having a volume resistivity of $2.7 \times 10^5$ Ω·cm, the above baked potassium titanate derivative was colored in dark purple and had a volume resistivity of $1.4 \times 10$ Ω·cm.

COMPARISON EXAMPLE 13

Potassium titanate was prepared in the same manner as in Example 14 except that niobium oxide was not used. The obtained titanate was slightly faded in blue color and had a volume resistivity of $4.9 \times 10^5$ Ω·cm.

EXAMPLE 15

In a mixer were mixed for one hour 10 parts of potassium titanate (Tismo D), 0.5 part of carbon black [Trade Name; MA 100, a product of Mitsubishi Kagaku Kogyo K.K.], 1 part of liquid paraffin and 0.1 part of antimony oxide (as above). The mixture was baked in the same manner as in Example 4 at a temperature of 1000° C. for 30 minutes. The baked product was cooled to room temperature and then poured into methanol. Thereto was added petroleum benzin to extract carbon components into petroleum benzin layer. This extraction was repeated. Precipitates in methanol layer was filtered and dried to obtain a black purple electrically conductive potassium titanate derivative having a volume resistivity of $1.9 \times 10^{-2}$ Ω·cm.

COMPARISON EXAMPLE 14

The mixture was baked in the same manner as in Example 15 except that antimony oxide was not used. The resulting baked product was colored in dark purple and had a volume resistivity of 8.3 Ω·cm.

EXAMPLE 18

In a mixer were mixed for one hour 3 parts of potassium titanate (Tismo D), 7 parts of barium titanate (as above) and 1 part of antimony oxide. The mixture was shaped at a pressure of 500 kg/cm² into a disc, 12 mm in diameter and 5 mm in thickness.

The disc was placed on a platinum boat and baked in nitrogen atmosphere at 1100° C. for one hour to obtain a light purple electrically conductive baked product having a volume resistivity of $9.3 \times 10^7$ Ω·cm.

COMPARISON EXAMPLE 15

The mixture was baked in the same manner as in Example 18 except that antimony oxide was not used. The resulting baked product was colored in gray white and had a volume resistivity of at least $10^{12}$ Ω·cm.

EXAMPLES 17 TO 24

Electrically conductive titanate derivatives were prepared with use of spray-dried mixtures of various titanates and compounds listed in Table 3. The results were given in Table 3.

TABLE 3

| Ex. | (A) Titanate | (B) Compound | (C) Additive | Ratio A/B/C | Baking Atmosphere | Baking Temp (°C.) | Baking Time (hr) | Color | Volume resistivity ($\Omega \cdot cm$) |
|---|---|---|---|---|---|---|---|---|---|
| 17 | Potassium titanate | $Nb_2O_5$ | Water | 10/0.3/15 | $N_2$ | 1000 | 1 | light blue | $7.3 \times 10^4$ |
| 18 | Potassium titanate | $Bi_2O_3$ | " | 10/0.2/15 | $N_2$ | 1000 | 1.5 | light blue | $4.6 \times 10^5$ |
| 19 | Potassium titanate | $V_2O_5$ | " | 10/0.5/15 | $N_2$ | 1000 | 0.5 | light blue | $1.3 \times 10^5$ |
| 20 | Potassium titanate | $Ta_2O_5$ | " | 10/0.5/15 | $N_2$ | 950 | 2 | light blue | $3.1 \times 10^5$ |
| 21 | Potassium titanate | $Nb_2O_5$ | " | 10/0.2/15 | $H_2$ | 950 | 0.5 | dark purple | $1.3 \times 10^5$ |
| 22 | Barium titanate | $SB_2O_3$ | " | 10/0.2/15 | $H_2$ | 950 | 1 | dark purple | $3.9 \times 10$ |
| 23 | Barium titanate | $Nb_2O_5$ | " | 10/0.8/15 | $N_2$ | 1200 | 1 | light purple | $3.3 \times 10^5$ |
| 24 | Barium titanate | $Nb_2O_5$ | " | 10/0.3/15 | $H_2$ | 950 | 0.5 | dark purple | $1.1 \times 10^5$ |

The present electrically conductive titanate derivative has the following excellent characteristics.

(1) While a lot of electrically conductive metal were used in the conventional covering process, amounts of element were reduced in less than 1/10, or less than 1/100 under some cases, in the present invention.

(2) In the reduction process for preparing titanate having a lower oxidation degree, the reducing agent was essential. However, the reducing condition is not necessarily required, and the desired titanate derivative can be prepared in inert gas atmosphere or in air in the present invention. Thus, the present invention is advantageous in economical point and security of working circumstances.

(3) The compound containing an element other than titanium used in the present invention promotes to render a material electroconductive. Thus, the present process is able to give electroconductivity to a titanate which is difficult to be reduced by the conventional reduction process. Further, the present process produces an electrically conductive titanate derivative by a reduction process at milder conditions than the conventional reduction process, hence very high in industrial use.

(4) To meet diversified needs and requirements for high quality for electrically conductive materials, it is earnestly desired to develop electrically conductive materials having white or light color. By the present process, it is easy to prepare an electrically conductive titanate derivative having white or light color. Thus, the present invention is excellent to suit to needs requirements.

(5) In the present invention, when the baking is conducted in reducing atmosphere, the reduction condition may be milder than that in the conventional process and an electrically conductive titanate derivative can be obtained without deteriorating shape and crystal form of the starting titanate. Thus, the present invention provides an electroconductive material with maintaining excellent characteristics inherent to the titanate, such as heat resistance, reinforcing effect when used in a composite product, hence having a high industrial use.

We claim:
1. An electrically conductive titanate of the formula:

$$M_xO.n(Ti_{1-z}L_zO_{2-p})$$

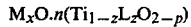

wherein M is alkali metal, n is an integer of 1 to 10, x is 1 or 2, L is at least one element of group (V) of the periodic table other than nitrogen, p is a number of $0 \leq p < 2$, and z is a number of $0 < z \leq \frac{1}{2}$, said element being introduced in an amount of 0.01 to 50 mole% based on one atom of titanium.

2. A derivative as claimed in claim 1, wherein said element is selected from the group consisting of V, Nb, Ta, P, As, Sb and Bi.

3. A process for preparing an electrically conductive titanate derivative of the formula:

$$M_xOn(Ti_{1-z}L_zO_{2-p})$$

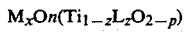

wherein M is alkali metal, n is an integer of 1 to 10, x is 1 or 2, L is at least one element of group (V) of the periodic table other than nitrogen, p is a number of $0 \leq p < 2$, and z is a number of $0 < z \leq \frac{1}{2}$, said element being introduced in an amount of 0.01 to 50 mole% based on one atom of titanium, said process comprising baking a mixture of a titanate and a compound containing said at least one element, said mixture containing 0.001 to 100 parts by weight of said compound per 100 parts by weight of said titanate, said baking being conducted at a baking temperature of 600 to 1500 degrees centigrade.

4. A process as claimed in claim 3, wherein said compound is an oxide, hydroxide, halide, nitrate, nitrite, sulfate, sulfite, alcoholate or organic complex compound of said at least one element.

5. A process as claimed in claim 3, wherein said element is selected from the group consisting of V, Nb, Ta, P, As, Sb and Bi.

6. A process as claimed in claim 3, wherein said mixture contains 0.1 to 50 parts by weight of said compound per 100 parts by weight of said titanate.

7. A process as claimed in claim 3, wherein said baking temperature is 800 to 1400 degrees centigrade.

* * * * *